(12) United States Patent
Sinclair et al.

(10) Patent No.: US 12,718,207 B2
(45) Date of Patent: Aug. 25, 2026

(54) SECURE VALUE TRANSFERS

(71) Applicant: Digital First Holdings LLC, Atlanta, GA (US)

(72) Inventors: Isaiah Shawn Sadrudin Sinclair, Kitchener (CA); Ethan James Hodge, Guelph (CA); Eason Liang, Guelph (CA); Mark William Schmid, Oakville (CA); Daniel Elliott Wang, Oakville (CA); Myron Ladyjenko, Guelph (CA); Ethan Kenneth Muir, Pickering (CA)

(73) Assignee: Digital First Holdings LLC, Atlanta, GA (US)

( * ) Notice: Subject to any disclaimer, the term of this patent is extended or adjusted under 35 U.S.C. 154(b) by 67 days.

(21) Appl. No.: 18/401,361

(22) Filed: Dec. 30, 2023

(65) Prior Publication Data

US 2025/0217783 A1 Jul. 3, 2025

(51) Int. Cl.
*G06Q 20/10* (2012.01)
*G06Q 20/36* (2012.01)
*G06Q 20/38* (2012.01)
*G06Q 20/40* (2012.01)

(52) U.S. Cl.
CPC ......... *G06Q 20/10* (2013.01); *G06Q 20/3678* (2013.01); *G06Q 20/3827* (2013.01); *G06Q 20/389* (2013.01); *G06Q 20/4014* (2013.01)

(58) Field of Classification Search
CPC ............... G06Q 20/10; G06Q 20/3678; G06Q 20/3827; G06Q 20/38; G06Q 20/4014
See application file for complete search history.

(56) References Cited

U.S. PATENT DOCUMENTS

| | | | | |
|---|---|---|---|---|
| 11,374,935 | B2 * | 6/2022 | Castinado | G06Q 20/2295 |
| 12,417,454 | B1 * | 9/2025 | Kommalapati | G06Q 20/3829 |
| 2020/0143372 | A1 * | 5/2020 | Liu | H04L 9/3239 |
| 2020/0258061 | A1 * | 8/2020 | Beadles | H04L 63/102 |
| 2023/0017855 | A1 * | 1/2023 | Kikinis | H04L 9/0643 |
| 2024/0054482 | A1 * | 2/2024 | Sonsurkar | G06Q 20/40145 |
| 2024/0249277 | A1 * | 7/2024 | Hwang | G06Q 20/02 |
| 2024/0370865 | A1 * | 11/2024 | Bernardi | G06Q 20/36 |
| 2025/0005544 | A1 * | 1/2025 | Albrechtsen | G06Q 20/389 |

* cited by examiner

*Primary Examiner* — Jalatee Worjloh
(74) *Attorney, Agent, or Firm* — Schwegman Lundberg & Woessner, P.A.

(57) ABSTRACT

Financial Institution (FI) applications (apps) are enhanced to permit customers to transfer cryptocurrency over a private blockchain (BC) to recipients. The recipients can maintain the amount of cryptocurrency received in their wallets or directly transfer the cryptocurrency in equivalent amounts of fiat currency into their FI accounts. Smart contracts on the private BC ensure that senders and receivers of the value transfers are registered and effectuate the wallet-to-wallet value transfers.

20 Claims, 3 Drawing Sheets

SECURE VALUE TRANSFERS

BACKGROUND

Increasingly consumers are shifting towards online banking services. However, many consumers are unable to use online banking services because they lack an internet connection or have poor and unreliable internet connections. Many countries and rural U.S. locations lack reliable connections to the internet via Wi-Fi or cellular. Additionally, low cost and fast money transfer services are not widely available in all countries. In the U.S. there is a lack of low close alternatives to e-transfers. As a result, consumers largely use cash application services, which require substantial fees. Financial Institutions (FIs) struggle with integrated payment services because there are wide variety of services that exist in the industry which makes it difficult for the FIs to connect with large portions of the U.S. market.

DETAILED DESCRIPTION

Many consumers around the world are unable to effectively participate in banking services of cash application ("app") services because they reside in areas where cellular and Wi-Fi is spotty, unreliable, or non-existent. FIs struggle providing cash app services to their customers because of the wide variety of cash app services that exists in the industry. Many of these cash app services do not integrate with one another, such that a consumer that wants to send cash from their cash app service to another consumer with a different cash app service is unable to do so.

That is, often when a peer-to-peer (P2P) money transfer is performed both the sending consumer and receiving consumer must have accounts with a same cash app service. Many FIs have created their own cash service apps but this has only led to more problems since a customer of the FI may prefer and use a different cash app service and because the customer often needs to transfer money to individuals that lack an account with the customer's FI and/or the individuals use different cash app services from that which is used by the customer.

These issues are solved with the teachings presented herein and below. A private blockchain (BC) is established between FIs, customers of the FIs register their cryptographic wallets with their FI accounts using their FI mobile applications ("apps"). Smart contracts are initiated on the private BC to evaluate whether a sending and receiving consumers in a P2P value transfer have linked their FI accounts with their wallets. When the accounts and wallets of a given transfer are registered, the value designated by the sender is transferred from the sender's wallet to the receiver's wallet.

The FIs' apps are enhanced to notify both the sender and receiver of the value transfer and value receipt. The FI's apps are further enhanced to permit the receiver to convert any received value transfer in the receiver's wallet from cryptocurrency to an equivalent of a government backed currency, which is then deposited in the receiver's financial account.

The FIs' apps are also enhanced to queue value transfers on a sender's device for subsequent transfer processing when the sender's device lacks network connectivity or has an unstable network connection. As soon as a reliable network connection is detected on the sender's device, the queued value transfer is processed. This permits consumers to stage value transfers when network connectivity is unavailable and ensures that their value transfers are processed once their devices have network connectivity.

Figure 1:
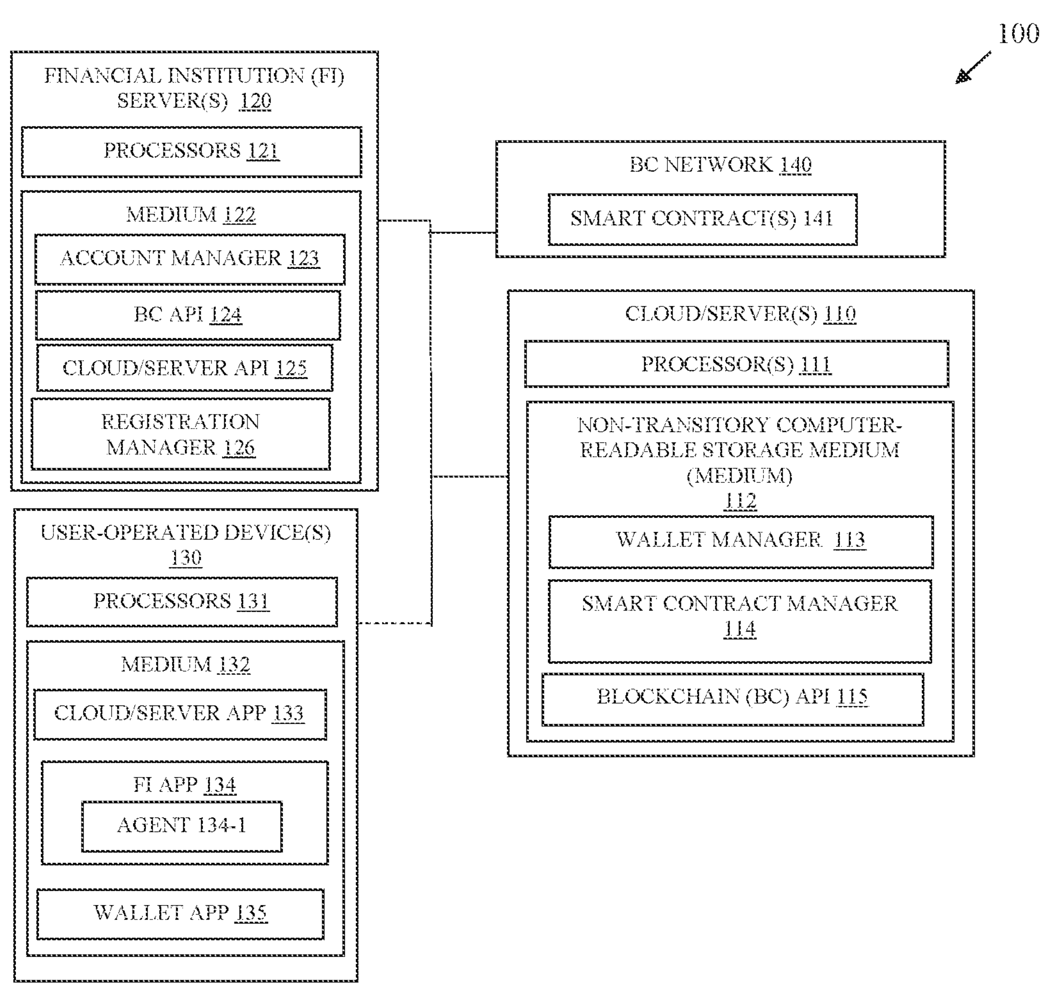
FIG. 1 is a diagram of a system for secure value transfers, according to an example embodiment.
Figure 2:
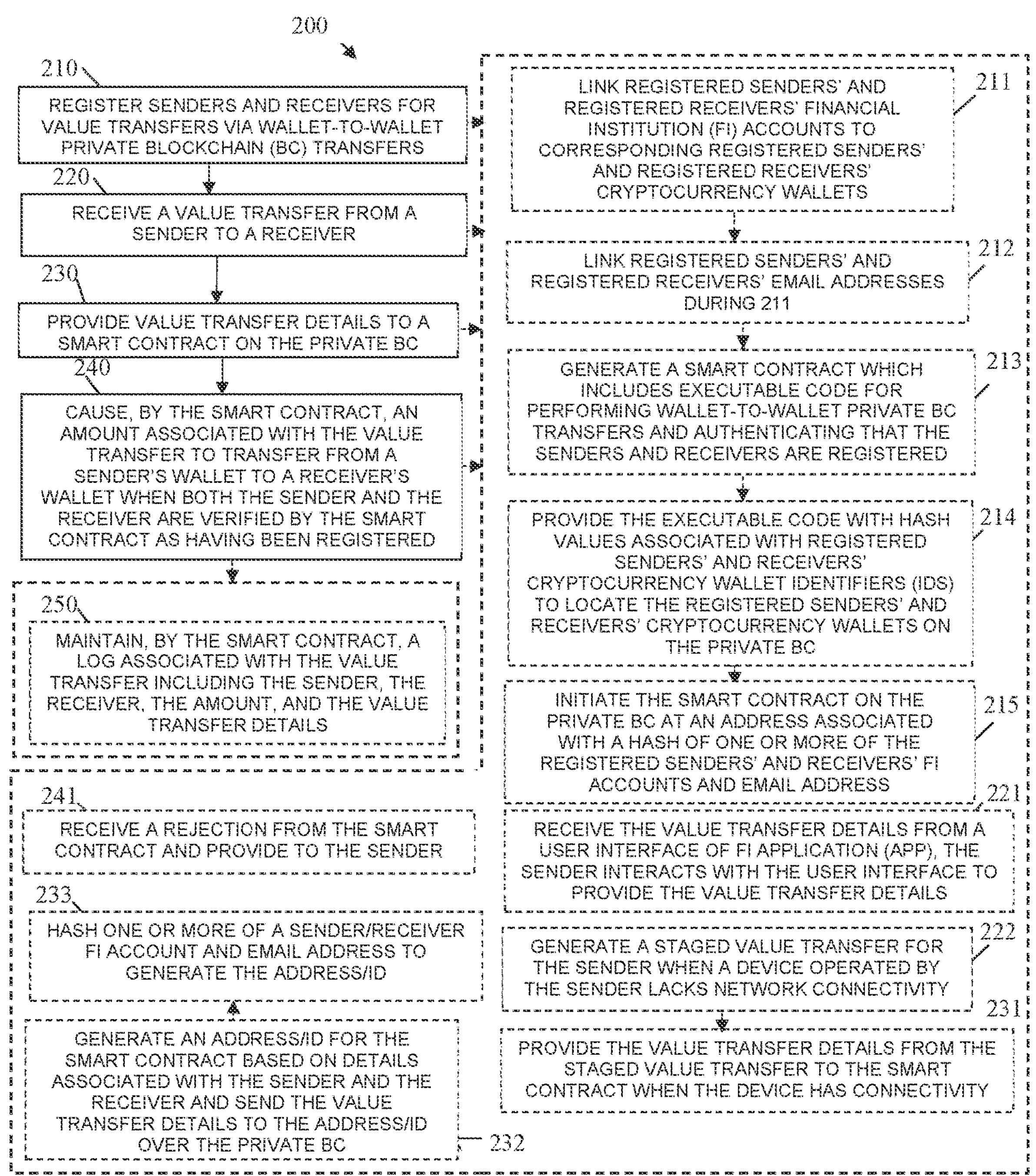
FIG. 2 is a diagram of a method for secure value transfers, according to an example embodiment.

A variety of other features and processing flows for the teachings presented herein are now discussed with reference to the FIGS. 1-3. FIG. 1 is a diagram of a system/platform 100 for secure value transfers, according to an example embodiment. Notably, the components are shown schematically in simplified form, with only those components relevant to understanding of the embodiments being illustrated.

Furthermore, the various components (that are identified in system/platform 100) are illustrated and the arrangement of the components are presented for purposes of illustration only. Notably, other arrangements with more or less components are possible without departing from the teachings of secure value transfers, presented herein and below.

System/platform 100 (herein after just "system 100") provides a processing environment by which FIs and/or cloud services permit customer P2P value transfers to be verified and performed using the FIs' apps on the customer devices, FI accounts of the customers, cryptocurrency wallets of the customers, and a private BC.

As used herein, the terms "customer," "consumer," "and/or "user" may be used interchangeably and synonymously herein and below. This refers to an individual that has registered their cryptocurrency wallet with their FI account for P2P value transfers. A "value transfer" refers to a transfer of something of value during a P2P transfer between a sending customer and a receiving customer: something of value" includes government backed fiat currency (i.e., cash), cryptocurrency (e.g., Bitcoin, Ethereum, etc.), non-fungible tokens (NFTs), etc. Notably, a customer refers to a customer of a FI, such that a customer can be an enterprise or an individual.

Furthermore, the terms "bank" and/or "FI," may be used interchangeably and synonymously herein and below. This refers to an entity that supplies a FI to a customer and provides a FI app for accessing the customer's account.

System 100 includes a cloud/server 110 (hereinafter just "cloud 110"), FI servers 120, user-operated devices 130, and a private BC network 140. Cloud 110 includes at least one processor 111 and a non-transitory computer-readable storage medium (hereinafter just "medium") 112, which includes instructions for a wallet manager 113, a smart contract manager 114, and a BC application programming interface (API) 115. The instructions when provided to and executed by processor 111 cause processor 111 to perform the processing or operations discussed herein and below for 113-115.

Each FI server 120 includes at least one processor 121 and a medium 122, which includes instructions for an account manager 123, a BC API 124, a cloud/server API (hereinafter just "cloud API") 125, and a registration manager 126. The instructions when provided to and executed by processor 121 cause processor 121 to perform the processing or operations discussed herein and below for 123-126.

Each user-operated device (hereinafter just "device") 130 includes at least one processor 131 and a medium 132, which includes instructions for cloud/server (hereinafter just "cloud") application (herein after just "app") 133, a FI app 134, and a wallet app 135. The instructions for the FI app 134 further includes instructions for agent 134-1. The instructions when provided to and executed by processor 131 from medium 132 cause processor 131 to perform the processing or operations discussed herein and below for 133-135, which includes 134-1.

Private BC network 140 (herein after just "BC 140") is distributed over a variety of devices that participate in the BC 140. BC 140 is a private BC associated with the cloud 110 and/or FI servers 120. The BC 140 includes executable instructions as smart contracts 141 in unique blocks of the BC 140.

Smart contract manager 114 generates one or more smart contracts 141 and initiates the smart contracts 141 on the private BC 140. The addresses with which the smart contracts 141 are installed over the private BC 140 are associated with hash values of registered customers FI accounts and/or email addresses. The smart contracts 141 include hash values for the registered sending and receiving wallet identifiers (as used herein "ids") and executable code that evaluate whether senders and receivers to a given value transfer are known based on the hash values of the wallet ids, and when both the senders and receivers are known, a value amount from a sending wallet is transferred over the private BC 140 to a receiving wallet using the hash values for the corresponding registered wallets to identify both the sender's wallet and the recipient's wallet over the private BC 140. When either the sender or receiver are unknown or not defined in the smart contract 141, the smart contract returns an indication of failure to one or more of wallet manager 113, agent 134-1, and account manager 123.

Initially, a customer of a FI registers a cryptographic wallet with their FI. This can be done in a few different manners. In a first case, the customer interacts with a user interface of FI app 134 to engage registration manager 126 and link the customer wallet identifier (id) with the customer's FI account. In a second case, the customer interacts with a user interface of cloud app 133 to engage wallet manager 113 and provide both a customer's FI account and wallet id. One or more of account manager 123 and wallet manager 113 maintains a table that links the customer's FI account to the customer's wallet id.

In an embodiment, in addition to linking a registered customer's wallet id and FI account, an email address associated with the FI account is registered. This permits a sender of a value transfer to identify a recipient of the transfer via either the recipient's email address or FI account.

The customer maintains a cryptographic wallet, which is accessible to the customer via wallet app 134 on device 130. FI app 134 includes an agent 134-1 which uses an API to interact with wallet app 135 for purposes of displaying cryptocurrency balances in the customer's wallet within the user interface of FI app 134 alongside FI account information that the customer has with the corresponding FI.

Agent 134-1 also interacts when a network connection is available with account manager 123 and/or a cryptographic exchange. This permits agent 134-1 to convert cryptocurrency held in the customer's wallet into fiat currency held in the customer's FI account. Thus, when a customer access a value transfer option provided within the user interface of FI app 134 and enters a fiat currency amount to transfer to a recipient, agent 134-1 can indicate to the customer the equivalent of cryptocurrency needed from the customer's wallet for the value transfer.

When a value transfer option is selected by the customer within the user interface of FI app 134, the recipient is presented, by agent 134-1, an account balance in the customer's FI account, and cryptocurrency balances by type of cryptocurrency in the customer's wallet. The user interface also presents a field for the customer to enter a transfer amount in fiat currency or in a cryptocurrency type and another field that identifies the recipient. Again, the recipient can be identified by the sending customer via the recipient's FI account of via the recipient's email address.

When the customer confirms a value transfer within the user interface of FI app 134, agent 134-1 constructs a private BC 140 communication using a hash value associated with the customer's FI account and wallet identifier (as used herein "ID" or "id") and broadcasts the amount of value being transferred from the customer's wallet to the recipient's wallet over the private BC 140. The hash value identifies a corresponding smart contract 141, which was initiated by smart contract manager 114. Smart contract 141 verifies that the customer and the recipient are registered participants in value transfers. Assuming both the customer and recipient are registered, the smart contract 141 obtains each wallet id for the customer and recipient and initiates a wallet-to-wallet transfer of the amount of cryptocurrency from the customer's wallet to the recipient's wallet.

Assuming device 130 lacked a network connection when the customer or sender confirmed a value transfer, agent 134-1 maintains the smart contract communication offline. Once agent 134-1 identifies that the device 130 has network connectivity, agent 134-1 broadcast the communication over the BC network 140 to the corresponding smart contract 141. In this way, the customer is able to stage value transfers when device 130 is offline and ensure that the value transfers are initiated and completed when device 130 is able to come back online at a subsequent point in time. This is particularly advantageous to customers that reside in areas with spotty or no Wi-Fi or cellular connectivity.

Registration by a customer via wallet manager 113 permits value transfers to recipients associated with different FIs from that which is associated with a given sender. In an embodiment, customers register via registration manager 126 of their FI and registration manager 126 then further registers the customers via wallet manager 113 so as to permit interbank value transfers for customers of different FIs.

Agent 134-1 also provides functionality to a recipient via their FI app 134. For example, when the recipient receives a value transfer, agent 134-1 identifies the sender and the amount within the user interface of FI app 134 to the recipient. The user interface presents an option to the recipient to move the cryptocurrency from the recipient's wallet to the recipient's financial account. In an embodiment, agent 134-1 provides the amount of cryptocurrency to wallet manager 113, which uses a cryptocurrency exchange to convert the amount of cryptocurrency to the corresponding fiat current and deposit the fiat currency amount in the recipient's FI account. In an embodiment, agent 134-1 notifies account manager 123 of the request with the amount of cryptocurrency. Account manager 123 uses BC API 124 to transfer the amount of cryptocurrency to a custodial wallet held by the FI and immediately credits the recipient's account with the corresponding amount of fiat currency. In an embodiment, a different smart contract 141 associated with a custodial wallet of the FI is accessed via agent 134-2 over the private BC 140 to cause the amount of cryptocurrency to transfer from the recipient's wallet to the custodial wallet and upon notification of the transfer agent 134-2 notifies account manager 123 and account manager 123 credits a corresponding amount of fiat currency to the recipient's FI account. The recipient of a value transfer can elect to maintain the value transfer in their cryptocurrency wallet or elect to convert and transfer the value transfer into fiat currency credited to their FI account.

In an embodiment, the smart contracts 141 maintain logs of value transfers, which can be accessed and retrieved via account manager 123 using BC API 124. Alternatively, wallet manager 113 retrieves the logs of the value transfers and provides for each value transfer to account manager 123.

In an embodiment, the private BC network 140 is a private Ethereum BC maintained by cloud 110 on behalf of multiple FIs. In an embodiment, the cryptocurrency type in the value transfers is Ethereum. This ensures fast value transfers and Ethereum provide one of the fastest wallet-to-wallet transfers available for cryptocurrency.

In an embodiment, a single FI provides the value transfer described in system 100, such that operations discussed above with respect to cloud 110 are subsumed into a corresponding FI server 120. In an embodiment, multiple FIs participate in the value transfers utilizing cloud 110.

In an embodiment, each FI participates in each transaction on the private BC 140 that involves a FI account of that FI. In this way, a transaction between FIs is verified by each of the FIs associated with the transaction before the smart contract 141 is initiated to perform the wallet-to-wallet value transfer. This is an added layer of security within the private BC 140, since each FI involved in the transaction of value transfer separately validates the value transaction.

System 100 permits FIs to integrated and provided P2P value transfers to their customers, which are not dependent on any particular cash app, and which is secured via a private BC 140. The value transfers are integrated into the FIs' apps. Furthermore, the value transfers can be staged offline when customer devices 130 lack network connectivity and immediately initiated over the private BC 140 as soon as the devices 130 regain network connectivity.

The above-referenced embodiments and other embodiments are now discussed with reference to FIGS. 2 and 3. FIG. 2 is a diagram of a method 200 for secure value transfers, according to an example embodiment. The software module(s) that implements the method 200 is referred to as a "value transfer manager." The value transfer manager is implemented as executable instructions programmed and residing within memory and/or a non-transitory computer-readable (processor-readable) storage medium and executed by one or more processors of one or more devices. The processor(s) of the device(s) that executes the value transfer manager are specifically configured and programmed to process the value transfer manager. The value transfer manager may have access to one or more network connections during its processing. The network connections can be wired, wireless, or a combination of wired and wireless.

In an embodiment, the device that executes the value transfer manager is cloud 110. In an embodiment, the device that executes the value transfer manager is a FI server 120. In an embodiment, at least a portion of the value transfer manager is executed by a plurality of devices on private BC 140. In an embodiment, the value transfer manager is executed on a combination of cloud 110, FI server 120, user device 130, and BC 140. In an embodiment, the value transfer manager is wallet manager 113, smart contract manager 114, BC API 115, cloud API 133, FI app 134, agent 134-1, account manager 1124, BC API 124, cloud API 125, and/or registration manager 126.

At 210, the value transfer manager registers senders and receivers (e.g., recipients) for value transfers via wallet-to-wallet private BC transfers. In an embodiment, at 211, the value transfer manager links registered senders' and registered receivers' FI accounts to corresponding registered senders' and registered receivers' cryptocurrency wallets or wallet identifiers (ids).

In an embodiment of 211 and at 212, the value transfer manager links registered senders' and registered receivers' email addresses during 211. In an embodiment of 212 and at 213, the value transfer manager generates a smart contract 141 which includes executable code (e.g., instructions) for performing wallet-to-wallet private BC transfers and for authenticating that the senders and receivers are registered.

In an embodiment of 213 and at 214, the value transfer manager provides the executable code with hash values associated with registered senders' and registered receivers' cryptocurrency wallet ids to locate the registered senders' and registered receivers' cryptocurrency wallets on the private BC 140. In an embodiment of 214 and at 215, the value transfer manager initiates the smart contract 141 on the private BC 140 at an address associated with a hash of one or more of the registered senders' and receivers' FI accounts and email addresses.

At 220, the value transfer manager receives a value transfer from a sender that is directed to a receiver. In an embodiment, at 221, the value transfer manager receives the value transfer details from a user interface of a FI mobile application 134. The sender interacts with the user interface to provide the value transfer details. In an embodiment, at 222, the value transfer manager generates a staged value transfer for the sender when a device 130 operated by the sender lacks network connectivity.

At 230, the value transfer manager provides value transfer details to the smart contract 141 on the private BC 140. In an embodiment of 222 and 230, at 231, the value transfer manager provides the value transfer details from the staged value transfer to the smart contract 141 when the device is detected as having regained network connectivity.

In an embodiment of 230 and at 232, the value transfer manager generates an address or an id for the smart contract 141 based on details associated with the sender and the receiver. The value transfer manager sends the value transfer details to the address or id over the private BC 140. In an embodiment of 232 and at 233, the value transfer manager hashes one or more of a sender's FI account, a receiver's FI account, a sender's email address, and/or a receiver's email address to generate the address or identifier.

At 240, the smart contract causes an amount associated with the value transfer to transfer from a sender's wallet to a receiver's wallet when both the sender and the receiver are verified by the smart contract 141 as having been registered. In an embodiment, at 241, the value transfer manager receives a rejection from the smart contract 141 indicating that either the sender or the receiver were not registered and in response to receiving the rejection, the value transfer manager provides the rejection to the sender.

In an embodiment, at 250, the smart contract 141 maintains a log associated with the value transfer, which includes the sender, the receiver, the amount, and the value transfer details. The value transfer manager obtains the log from the smart contract 141 using the details of the value transfer to access the private BC 141.

Figure 3:
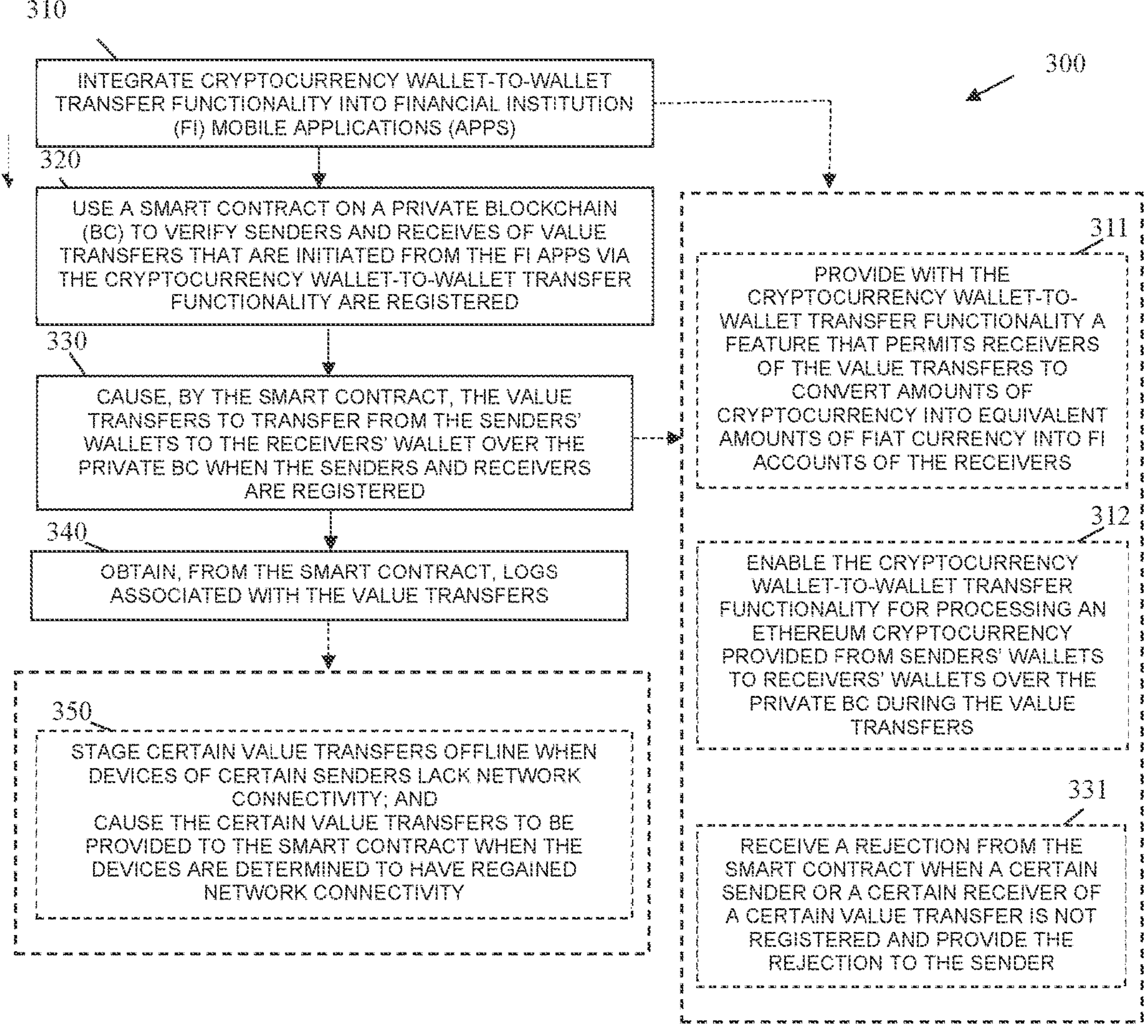
FIG. 3 is a diagram of another method for secure value transfers, according to an example embodiment.

FIG. 3 is a diagram of another method 300 for secure value transfers, according to an example embodiment. The software module(s) that implements the method 300 is referred to as a "value transfer service." The value transfer service is implemented as executable instructions programmed and residing within memory and/or a non-transitory computer-readable (processor-readable) storage medium and executed by one or more processors of one or more device(s). The processors that execute the value transfer service are specifically configured and programmed for processing the value transfer service. The value transfer service may have access to one or more network connections during its processing. The network connections can be wired, wireless, or a combination of wired and wireless.

In an embodiment, the device that executes the value transfer service is cloud 110. In an embodiment, the device that executes the value transfer service is a FI server 120. In an embodiment, at least a portion of the value transfer service is executed by a plurality of devices on BC 140. In an embodiment, the value transfer service is executed on a combination of cloud 110, FI server 120, user device 130, and BC 140. In an embodiment, the value transfer service is wallet manager 113, smart contract manager 114, BC API 115, account manager 123, BC API 124, cloud API 125, registration manager 126, cloud API 133, FI app 134, agent 134-1, and/or method 200. The value transfer service presents another and, in some ways, enhanced processing perspective from that which were discussed above for system 100 and method 200.

At 310, the value transfer service integrates cryptocurrency wallet-to-wallet transfer functionality into FI mobile apps 134. In an embodiment, at 311, the value transfer service provides, with the cryptocurrency wallet-to-wallet transfer functionality, a feature that permits receivers of the value transfers to convert amounts of cryptocurrency into equivalent amounts of fiat currency into FI accounts of the receivers. In an embodiment, at 312, the value transfer service enables the cryptocurrency wallet-to-wallet transfer functionality for processing an Ethereum cryptocurrency provided from senders' wallets to receivers' wallets over the private BC 140 during the value transfers.

At 320, the value transfer service uses a smart contract 141 on the private BC 140 to verify senders and receivers of the value transfers that are initiated from the FI apps via the cryptocurrency wallet-to-wallet transfer functionality are registered. At 330, the smart contract 141 causes the value transfers to transfer from the senders' wallets to the receivers' wallets over the private BC 140 when the senders and the receivers are registered. In an embodiment, at 331, the value transfer service receives a rejection from the smart contract 141 when a certain sender or a certain receiver of a certain value transfer is not registered. The value transfer service provides the rejection to the sender.

At 340, the value transfer service obtains from the smart contract 141, logs associated with the value transfers. In an embodiment, at 350, the value transfer service states certain value transfers offline when devices 130 of certain senders lack network connectivity. The value transfer service causes the certain value transfers to be provided to the smart contract 141 when the devices 130 are determined to have regained network connectivity.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:

registering senders and receivers for value transfers via wallet-to-wallet private blockchain (BC) transfers;

receiving a value transfer from a sender to a receiver;

providing value transfer details to a smart contract on a private Ethereum BC;

transferring, by the smart contract, an amount associated with the value transfer to be sent from a sender's wallet to a receiver's wallet over the private Ethereum BC on behalf of multiple Financial Institutions (FIs);

wherein the smart contract uses pre-stored hash values associated with registered wallet identifiers to directly locate and transfer between the sender's wallet and the receiver's wallet on the private Ethereum BC; and wherein the private Ethereum BC is a private Ethereum BC maintained by a cloud on behalf of the multiple FIs, and wherein Ethereum provides fast wallet-to-wallet transfers;

wherein the smart contract verifies that both the sender and the receiver are registered.

2. The method of claim 1 further comprising:

maintaining, by the smart contract, a log associated with the value transfer including the sender, the receiver, the amount, and the value transfer details.

3. The method of claim 1, wherein registering further includes linking a sender's financial institution (FI) account to the sender's wallet and linking a receiver's FI account to the receiver's wallet.

4. The method of claim 3, wherein linking further includes linking registered senders' and registered receivers' email addresses during the registering.

5. The method of claim 4, wherein registering further includes generating the smart contract comprising executable code for performing the wallet-to-wallet private BC transfers and authenticating that the senders and receivers are registered.

6. The method of claim 5, wherein generating further includes providing the executable code with the pre-stored hash values associated with registered senders' and receivers' cryptocurrency wallet identifiers to locate the registered senders' and receivers' cryptocurrency wallets on the private Ethereum BC.

7. The method of claim 6, wherein generating further includes initiating the smart contract on the private Ethereum BC at an address associated with a hash of one or more of the registered senders' and registered receivers' FI accounts and email addresses.

8. The method of claim 1, wherein receiving further includes receiving value transfer details from a user interface of a financial institution (FI) application, wherein the sender interacts with the user interface to provide the value transfer details.

9. The method of claim 1, wherein receiving further includes generating a pre-staged value transfer for the sender when a device operated by the sender lacks network connectivity.

10. The method of claim 9, wherein providing further includes providing the value transfer details from the pre-staged value transfer to the smart contract when the device is determined to have regained network connectivity.

11. The method of claim 1, wherein providing further includes generating an address or an identifier for the smart contract based on details associated with the sender and the receiver and sending the value transfer details to the address or identifier over the private Ethereum BC.

12. The method of claim 11, wherein generating further includes hashing one or more of a sender's financial institution (FI) account, a sender's email address, a receiver's FI account, and a receiver's email address to generate the address or the identifier.

13. The method of claim 1, wherein causing further includes receiving a rejection from the smart contract when the sender or the receiver is not registered and providing the rejection to the sender.

14. A method, comprising:

integrating cryptocurrency wallet-to-wallet value transfer functionality into financial institution (FI) mobile applications (apps), wherein the cryptocurrency wallet-to-wallet value transfer functionality processes Ethereum cryptocurrency transfers between senders' wallets and receivers' wallets over a private Ethereum blockchain (BC) maintained on behalf of multiple Financial Institutions (FIs) using smart contracts with pre-stored hash values for direct wallet-to-wallet transfers, wherein the private Ethereum BC is maintained by a cloud on behalf of the multiple FIs, and wherein Ethereum provides fast wallet-to-wallet transfers;

verifying, by the smart contracts, that senders and receivers of value transfers, which are initiated from the FI mobile apps via the cryptocurrency wallet-to-wallet value transfer functionality, are registered;

transferring, by the smart contracts, the value transfers from the senders' wallets to the receivers' wallets over the private Ethereum BC when the senders and the receivers are registered; and obtaining, from the smart contracts, logs associated with the value transfers.

15. The method of claim 14, further comprising:

staging certain value transfers offline when devices of certain senders lack network connectivity; and causing certain value transfers to be provided to the smart contracts when the devices are determined to have regained network connectivity.

16. The method of claim 14, wherein integrating further includes providing, with the cryptocurrency wallet-to-wallet value transfer functionality, a feature that permits receivers of the value transfers to convert amounts of cryptocurrency into equivalent amounts of fiat currency and deposit the equivalent amounts of fiat currency into FI accounts of the receivers.

17. The method of claim 14, wherein integrating further includes enabling the cryptocurrency wallet-to-wallet value transfer functionality for processing an Ethereum cryptocurrency provided from senders' wallets to receivers' wallets over the private Ethereum BC during the value transfers.

18. The method of claim 14, wherein causing further includes receiving a rejection from particular smart contract when a certain sender or a certain receiver of a certain value transfer is not registered and providing the rejection to the certain sender.

19. A system, comprising:

at least one server comprising a processor and a non-transitory computer-readable storage medium;

the non-transitory computer-readable storage medium comprises executable instructions; and the executable instructions when executed on the processor cause the processor to perform operations comprising:

linking registered wallet identifiers and financial institution (FI) accounts of registered senders and registered receivers to a value transfer service;

maintaining a smart contract on a private Ethereum blockchain (BC) maintained on behalf of multiple FIs, wherein the private Ethereum BC is a private Ethereum BC maintained by a cloud on behalf of the multiple FIs, and wherein Ethereum provides fast wallet-to-wallet transfers, wherein the smart contract uses pre-stored hash values associated with registered wallet identifiers to directly locate wallets and verify that senders and receivers are registered before permitting wallet-to-wallet value transfers over the private Ethereum BC; and converting cryptocurrency of first amounts into equivalent second amounts in a fiat currency and crediting certain registered receivers' FI accounts of certain registered receivers with the equivalent second amounts of fiat currency based on instructions received from the certain registered receivers.

20. The system of claim 19, the executable instructions when executed on the processor further cause the processor to perform operations comprising:

providing the value transfer service via mobile applications associated with FIs.

* * * * *